United States Patent [19]

Harrison

[11] 4,144,872

[45] Mar. 20, 1979

[54] SOLAR ENERGY COLLECTOR

[75] Inventor: Henry Harrison, Locust Valley, N.Y.

[73] Assignee: Halm Instrument Co., Inc., Glen Head, N.Y.

[21] Appl. No.: 676,548

[22] Filed: Apr. 13, 1976

[51] Int. Cl.² .............................................. F24J 3/02
[52] U.S. Cl. ................................................ 126/270
[58] Field of Search ............... 126/270, 271; 237/1 A; 165/48; 60/641

[56] References Cited

U.S. PATENT DOCUMENTS

| 246,626 | 9/1881 | Morse | 126/270 |
|---|---|---|---|
| 2,680,437 | 6/1954 | Miller | 126/270 |
| 2,680,565 | 6/1954 | Lof | 126/271 |
| 3,250,269 | 5/1966 | Sherock | 126/271 |
| 3,453,666 | 7/1969 | Hedges | 126/271 |
| 3,875,925 | 4/1975 | Johnston | 126/270 |
| 3,908,631 | 9/1975 | Rom | 126/270 |
| 3,919,998 | 11/1975 | Parker | 126/270 |
| 3,955,555 | 5/1976 | Bostrom | 126/270 |
| 3,981,445 | 9/1976 | Custer | 126/270 |
| 3,990,635 | 11/1976 | Restle et al. | 126/270 |
| 4,050,443 | 9/1977 | Peck et al. | 126/270 |

FOREIGN PATENT DOCUMENTS

| 2403032 | 7/1975 | Fed. Rep. of Germany | 126/271 |
|---|---|---|---|
| 1301853 | 1/1973 | United Kingdom | 126/271 |

Primary Examiner—Carroll B. Dority, Jr.
Assistant Examiner—James C. Yeung
Attorney, Agent, or Firm—James P. Malone

[57] ABSTRACT

A solar collector for collecting radiant energy and transferring it as heat to a moving air stream. A housing has means to provide an air stream through the housing. At least one translucent cover is mounted on the housing for the entrance of radiation into the housing. A plurality of spaced apart partially translucent sheets in said air stream, substantially parallel to and coextensive with the cover, whereby a portion of said entering radiation is absorbed by each successive partially translucent sheet and transmitted to said air stream as heat.

11 Claims, 4 Drawing Figures

U.S. Patent
Mar. 20, 1979
4,144,872
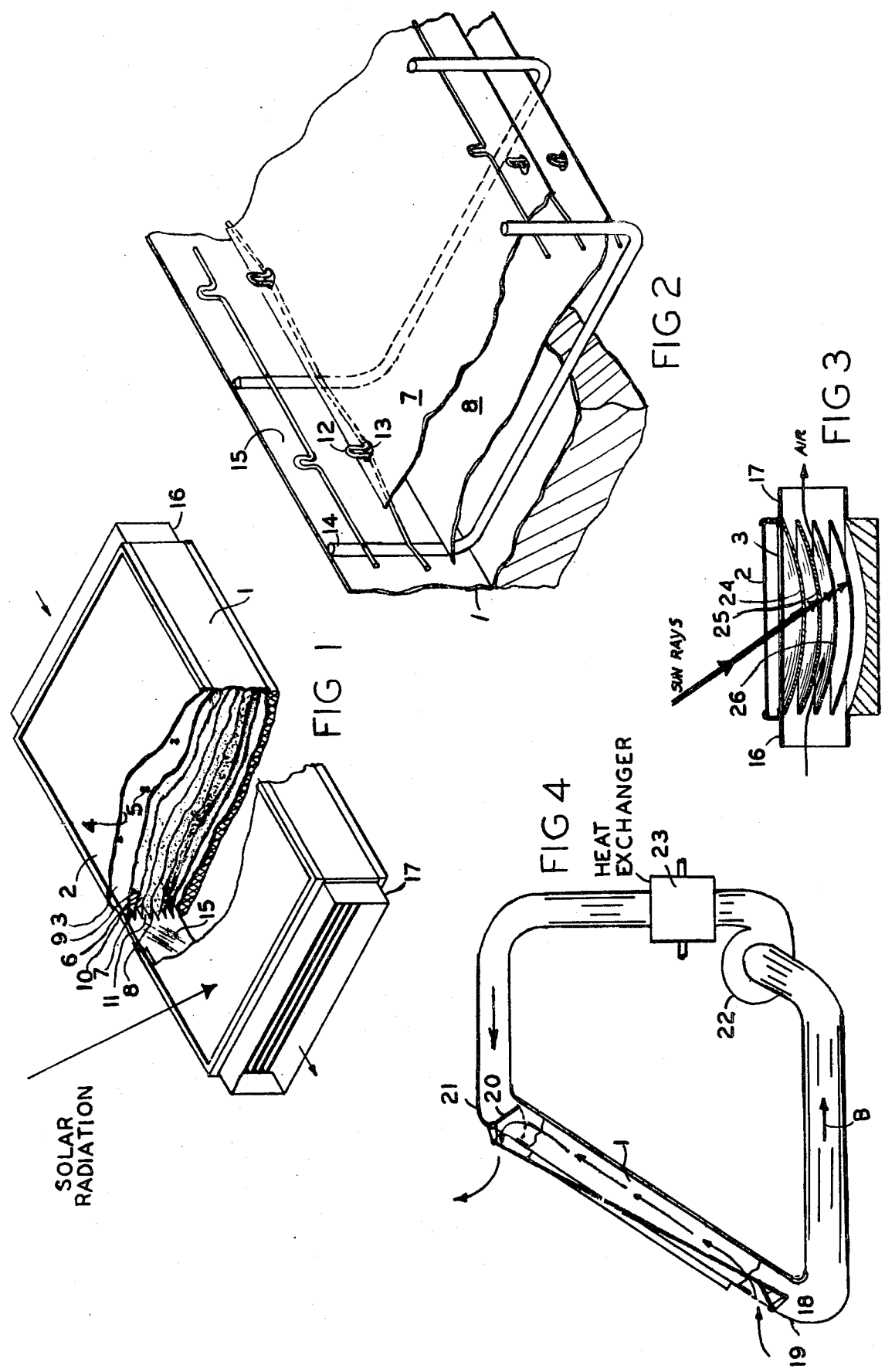

SOLAR ENERGY COLLECTOR

This invention relates to Solar Energy Collectors and more particularly to high efficiency heat collectors.

Flat plate collectors which collect heat from sun radiation and transfer it to an air stream typically have one or more transparent or translucent covers, a blackened absorbing surface, and an air passage in thermal contact with the absorbing surface. As in other flat plate collectors, the efficiency of heat collection depends on the temperature of the absorber surface because heat can escape from the absorber by radiation and conduction to the surroundings without entering the air stream. The best efficiency is obtained when the temperature of the absorbing surface is very nearly equal to the temperature of the air stream in contact with it. In air-heating collectors, however, the rate of heat transfer to the air stream is not much more than 1 BTU per square foot per hour per degree temperature difference, while the rate of heat absorption from the sun may approach 300 BTU per square foot per hour. Thus the temperature difference between the absorber and the air stream typically is high, and the proportion of absorbed heat which escapes collection is correspondingly large.

Various finned structures of conducting material have been tried in order to improve the heat flow from the absorber to the air stream. These structures are usually costly, and because the rate of heat flow per unit area is so low they are generally only partly effective. Furthermore, they often introduce unwanted resistance into the air stream, which increases the power required to circulate air. In order to reach additional fin heat transfer area, it is usually necessary for the heat to flow through an extended path of heat conducting material, and if the temperature drop in this path is to be low, the quantity and quality, and therefore the cost, of the heat conducting material must be high.

In the present invention, a minimum conduction path is required because the incoming radiation travels directly to the extended heat transfer surface. Furthermore, it is absorbed at a substantially uniform rate over the entire area of the heat transfer surfaces so that hot spots are avoided. Consequently the air stream carrying away the heat is substantially uniform, resulting in a low power requirement for circulating air.

Accordingly, it is an object of this invention to provide a new and improved solar heat collector which collects heat from the suns rays and transfers it efficiently to an air stream.

It is also an object to provide such a collector requiring a minimum amount of heat conducting material.

A further object is to provide a heat collector requiring a minimum amount of power to drive the air stream through it.

Another object is to provide a solar collector for collecting radiant energy and transferring it as heat to a moving air stream, comprising a housing, means to provide an air stream through said housing, at least one translucent cover mounted on said housing for the entrance of radiation into said housing, and a plurality of spaced apart partially translucent sheets mounted in said air stream, substantially parallel to and coextensive with said cover, whereby a portion of said entering radiation is absorbed by each successive partially translucent sheet and transmitted to said air stream as heat.

Other objects relating to cost, simplicity, and durability will be apparent to those skilled in the art from a consideration of the following drawings and description.

FIG. 1 is a general view of a collector according to this invention, showing the absorbing surfaces, the air passage and the path of entering light rays.

FIG. 2 is a detail of the collector of FIG. 1, showing a method of mounting the absorbing surfaces for convenient replacement.

FIG. 3 is a section view of an embodiment of this invention in which glass is used as the absorber to make an extremely durable collector.

FIG. 4 shows a method of protecting the collector against overheating.

In FIG. 1, it is seen that the collector has a housing 1 of generally rectangular cross section. The front 2, of the housing is of translucent material to permit the entry of sunlight. A second translucent cover 3, creates an insulating dead-air space 4, behind the first cover. A desirable material for these two covers is clear glass reinforced polyester, which has high radiation transmission but non-specular reflection, and also possesses good strength and durability. Spacers 5, between the two covers add to the strength of the structure and maintain the spacing between them.

Several absorbing sheets 6, 7, 8, etc., spaced apart in parallel relation by spaces 9, 10, 11, etc., receive sunlight and convert it to heat. The sheets are made of transparent material, a transparent plastic such as "mylar", and are sprayed or printed with a thin layer of specks of black material so that a suitable small fraction of the incident light is absorbed on each sheet while the remainder passes on to the next sheet. Because the incident light is substantially uniform, while the black specks are small and closely spaced and the sheet is thin, the two surfaces of each sheet are at substantially uniform temperature.

Referring to FIG. 2, the sheets may be supported in tension by a series of spring hooks 12, on each side of the housing 1, which engage perforations 13, in the side edges of the sheets. These hooks may be wire forms secured by spot welding to wire frames 14. This method of securing the sheets as well as maintaining them flat and parallel permits them to be individually replaced if that should become necessary. Other methods of securing the sheets will be evident to those skilled in the art.

The ideal absorption of radiation at each sheet is the absorption which produces the same heating effect at each sheet. If the effect of reflections from the surfaces of the sheets is neglected, and there are N sheets, 1/N should be absorbed in the first sheet, 1/N-1 in the second, 1/N-2 in the third, and so on until all the remaining light is absorbed in the last sheet. Thus, if there are eight sheets, the first absorbs ⅛ of the incident light, the second absorbs 1/7 of the remaining ⅞, the third absorbs 1/6 of the remaining 6/8, and so on.

When reflection at the sheet surfaces is taken into account, a slightly lower absorption rate can be used in the first few sheets, because they are subjected to back-reflected light from the succeeding sheets as well as to the incident light. The proportion of back-reflected light striking the lower sheets is lower. On the other hand, the sheets near the top are also subject to greater losses by heat exchange with the cooler covers, so that under some conditions they should be slightly more absorptive if uniform temperature is to be maintained.

As in any flat plate collector, the translucent area of the cover 2, defines the amount of radiation which can enter the collector. Some of this radiation falls on the inside walls of the housing, where it is partially absorbed and partially reflected. To maximize the uniformity of heating, the inside walls of the housing have reflecting surfaces 15. Ideally, these surfaces are specular reflectors, which can be polished aluminum, but white paint, which is a diffuse reflector, may be used, since it may have a higher reflectance. As a further refinement, the absorptance of the sheets may be reduced near the edges to compensate for the average additional radiation reflected from the side walls.

The housing 1, has adapters 16 and 17, to facilitate connection to air ducts. Air flows in at 16, and out at 17, and as it passes between the sheets 6, 7, 8, etc., it absorbs heat from them with a minimum of unevenness of temperature. Because the sheets are smooth, they present a minimum of flow resistance to the air stream.

If the air flow is stopped while the sun is shining on this collector, temperatures in the absorbers may soon become too high for ordinary plastics. FIG. 4, shows one way overheating can be prevented. Ports 18, in the lower feed manifold 19 and 20, in the upper output manifold 21, are normally closed due to normal air flow B, through the air-circulating ducts. These ports open when flow through the ducts falls to zero so that natural convection A through the collector can carry away the heat absorbed. The ports close automatically when normal flow recommences, so that the ambient air is again excluded and air is forced by fan 22, through the collector and through the heat exchanger or storage device 23.

A second way of preventing damage to the absorber surfaces is to make them of glass, as shown in FIG. 3. Prior art devices are known which use blackened glass as the absorbing medium. However, glass, having a very low thermal conductivity and a low strain tolerance, is often broken by thermal shock resulting from differential thermal expansion. Some relief from these strains, which may result from shadows on the darkened glass surfaces, is provided by the double curvature of glass sheets 24, 25, 26, etc. A double curved surface can accommodate some strain by changing its curvature with much less local elongation or compression than would take place in a flat sheet. The double curved sheets 24, 25, 26, are shown as shallow bowls having curvatures along perpendicular axes.

I claim:

1. A solar collector for collecting radiant energy and transferring it as heat to a moving air stream, comprising a housing, means to provide an air stream through said housing, at least one translucent cover mounted on said housing for the entrance of radiation into said housing, and a plurality of laterally spaced apart partially translucent heat absorbing sheets mounted in said air stream, substantially parallel to and coextensive with said cover, whereby a portion of said entering radiation is absorbed by substantially every part of each successive partially translucent sheet and transmitted to said air stream as heat.

2. A solar collector according to claim 1, in which said sheets are of transparent plastic partially blackened.

3. A solar collector according to claim 1 having elastic hook means mounted adjacent to the side of said housing, said sheets being detachably supported and stretched flat by said elastic hook means.

4. A solar collector according to claim 1, in which the inside side walls of said housing are coated with radiation reflective material to reduce the absorption of radiation by said walls.

5. A solar collector according to claim 1, in which the said partially translucent sheets are of partially blackened glass.

6. A solar collector according to claim 5, in which the glass sheets are doubly curved to reduce stresses from thermal gradients.

7. A solar collector according to claim 1, having damper means responsive to the flow of air entering through the ports of the housing such that said dampers are closed when air is entering in normal operation, but open to permit free circulation through the collector when normal operation air is not entering.

8. A collector according to claim 1 in which said partially translucent sheets are rendered partially light-absorbing by small closely spaced light-absorbing specks thereon.

9. A collector according to claim 1 in which said partially light-absorbing translucent sheets are of thin plastic.

10. Apparatus as in claim 1 wherein the absorbed radiation of the sheets is transmitted to the air stream from both sides of the sheets.

11. A solar collector for collecting radiant energy and transferring it as heat to a moving air stream, comprising a housing, means to provide an air stream through said housing, at least one translucent cover mounted on said housing for the entrance of radiation into said housing, and a plurality of spaced apart partially translucent sheets mounted in said air stream, substantially parallel to and coextensive with said cover, whereby a portion of said entering radiation is absorbed by every part of each successive partially translucent sheet and transmitted to said air stream as heat, the said successive partially translucent sheets absorbing successively greater fractions of the radiation incident on them, so that each such sheet absorbs substantially the same amount of radiation as each other such sheet, and the said sheets are spaced apart by substantially equal spaces.

* * * * *